(12) United States Patent
Kurita et al.

(10) Patent No.: US 11,594,789 B2
(45) Date of Patent: Feb. 28, 2023

(54) POWER STORAGE DEVICE (71) Applicant: KABUSHIKI KAISHA TOYOTA JIDOSHOKKI, Aichi-ken (JP)

(72) Inventors: Mikiya Kurita, Kariya (JP); Motoaki Okuda, Kariya (JP); Atsushi Minagata, Kariya (JP); Yohei Hamaguchi, Kariya (JP); Masato Ogasawara, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 458 days.

(21) Appl. No.: 16/622,579

(22) PCT Filed: Apr. 26, 2018

(86) PCT No.: PCT/JP2018/016905
§ 371 (c)(1),
(2) Date: Dec. 13, 2019

(87) PCT Pub. No.: WO2018/235428
PCT Pub. Date: Dec. 27, 2018

(65) Prior Publication Data
US 2020/0144583 A1 May 7, 2020

(30) Foreign Application Priority Data
Jun. 23, 2017 (JP) .............................. JP2017-123374

(51) Int. Cl.
*H01M 50/54* (2021.01)
*H01G 9/048* (2006.01)

(52) U.S. Cl.
CPC ............ *H01M 50/54* (2021.01); *H01G 9/048* (2013.01)

(58) Field of Classification Search
None
See application file for complete search history.

(56) References Cited

U.S. PATENT DOCUMENTS

2016/0336545 A1  11/2016  Wakimoto et al.
2019/0013507 A1*  1/2019  Shinyashiki ........ H01M 50/543

FOREIGN PATENT DOCUMENTS

JP    60-181859     12/1985
JP    2002-373639   12/2002
(Continued)

OTHER PUBLICATIONS

International Search Repot issued in International Patent Application No. PCT/JP2018/016905, dated Jul. 24, 2018.
(Continued)

*Primary Examiner* — Daniel S Gatewood
(74) *Attorney, Agent, or Firm* — Greenblum & Bernstein, P.L.C.

(57) ABSTRACT

A secondary battery is provided with first and second electrode assembly bodies and first and second negative electrode tab groups. The first and second negative electrode tab groups respectively have collected foil portions each constituted by a plurality of collected tab portions and extension portions. The extension portions of the respective tab groups have portions-to-be-welded and step portions. In the step portions, the plurality of tabs are laminated in a state that the end portions thereof are shifted in a step-like manner. The secondary battery is provided with an overlapped portion where the step portions of the first negative electrode tab group and the second negative electrode tab group are overlapped with each other in the lamination direction of the negative electrode tabs.

7 Claims, 5 Drawing Sheets

(56) References Cited

FOREIGN PATENT DOCUMENTS

| JP | 2013-196959 | | 9/2013 | |
|----|----|----|----|----|
| JP | 2013196959 A | * | 9/2013 | |
| JP | 2016-219124 | | 12/2016 | |
| WO | 2017/038042 | | 3/2017 | |
| WO | WO-2017038402 A1 | * | 3/2017 | ............ B01D 61/00 |

OTHER PUBLICATIONS

International Preliminary Report on Patentability issued in International Patent Application No. PCT/JP2018/016905, dated Dec. 24, 2019, with English translation.

* cited by examiner

POWER STORAGE DEVICE

TECHNICAL FIELD

The present invention relates to a power storage device that includes a first electrode assembly and a second electrode assembly.

BACKGROUND ART

Conventionally, vehicles such as electric vehicles (EV) and plug-in hybrid vehicles (PHV) are equipped with a power storage device, such as a lithium-ion rechargeable battery, storing electric power to be supplied to motors or the like. A rechargeable battery includes an electrode assembly that includes sheets of electrodes, namely, positive electrodes and negative electrodes, insulated from each other and alternately stacked and a case that accommodates the electrode assembly. Each electrode includes a tab projecting from a portion of one side of the electrode. All of the tabs have the same projection length. The electrode assembly includes tab groups in which the tabs of electrodes are stacked for each polarity. The tab groups each include a foil collection in which the tabs are collected at any position in the stacking direction of the electrodes and an extension extending from the foil collection in the stacking direction. Electric power is drawn out of the rechargeable battery through electrode terminals that are electrically connected to the electrode assembly. The rechargeable battery includes a weld portion that welds a portion (e.g., conductive member) of an electrode terminal to a portion of the extension in which all of the tabs are stacked in the tab group having the same polarity. The weld portions electrically connect the positive electrodes and the negative electrodes to the electrode terminals having the respective polarities.

When welding the tab groups to the conductive members, if a large number of tabs is stacked and all of the tabs are attempted to be welded at the same time, energy needed for welding will be increased. In this regard, for example, in patent document 1, a tab group of each polarity is separated into a first tab group and a second tab group and welded. In this case, the number of tabs that are welded at the same time is reduced. This reduces the energy necessary for each welding. As a result, for example, use of a large welding device may be avoided.

PRIOR ART DOCUMENT

Patent Document

Patent Document 1: Japanese Laid-Open Patent Publication No. 2013-196959

SUMMARY OF THE INVENTION

Problems that the Invention is to Solve

As described above, all of the tabs have the same projection length. Thus, when the foil collection of the tab group is collected at any position in the stacking direction of the electrodes, the distal ends of the tabs configuring the tab group are not aligned with each other. For example, the foil collection of the tab group may be located at a position corresponding to a first end of the electrode assembly in the stacking direction of the electrodes. In this case, of two tabs in the tab group located adjacent to each other in the stacking direction, the distal end of the tab located toward the first end of the electrode assembly projects more than the distal end of the tab located toward a second end of the electrode assembly. Thus, the extension of the tab group includes a step portion having a structure in which the distal ends of the tabs are arranged in a stepped manner at a side closer to a distal portion of the tab group than a portion in which all of the tabs are stacked.

When the first tab group and the second tab group of the same polarity are arranged so that the step portion of each tab group is directed toward an inner surface of the case, the step portion may contact the case, and the electrode assembly and the case may form a short circuit depending on the length of the step portions. When the first tab group and the second tab group are arranged so that the step portions are directed toward each other, depending on the position of the foil collections and the length of the step portions, it needs to be ensured that the space used for the first tab group and the second tab group extends in the stacking direction of the electrodes. This may produce unused space. The step portions may be cut to avoid the contact with the case and to reduce the space. However, the pieces cut from the tab group may remain as unwanted obstructions.

It is an object of the present invention to provide a power storage device configured so that tab groups are appropriately arranged.

Means for Solving the Problems

To achieve the above object, a power storage device includes a first electrode assembly and a second electrode assembly, in which each of the electrode assemblies includes multiple positive electrodes and multiple negative electrodes, which are sheets of electrodes differing in polarity from each other, the positive electrodes and the negative electrodes are alternately stacked in an insulated state, and each of the electrodes includes a tab projecting from a portion of one side of the electrode; a positive-side first tab group configured by the tabs of the positive electrodes in the first electrode assembly; a negative-side first tab group configured by the tabs of the negative electrodes in the first electrode assembly; a positive-side second tab group configured by the tabs of the positive electrodes in the second electrode assembly; a negative-side second tab group configured by the tabs of the negative electrodes in the second electrode assembly; a positive-side conductive member joined to the positive-side first tab group and the positive-side second tab group; and a negative-side conductive member joined to the negative-side first tab group and the negative-side second tab group. A direction in which the electrodes are stacked in the first electrode assembly is a first stacking direction. A direction in which the electrodes are stacked in the second electrode assembly is a second stacking direction. Each of the first electrode assembly and the second electrode assembly includes a first end and a second end, which are opposite ends in a corresponding one of the stacking directions. The first electrode assembly and the second electrode assembly are arranged so that an end surface of the first electrode assembly located at the first end is opposed to an end surface of the second electrode assembly located at the first end. At each of a positive side and a negative side, the first tab group and the second tab group each include a foil collection configured by a portion of the tabs collected in the stacking direction of a corresponding one of the electrode assemblies and an extension extending from the foil collection so that the extensions extend toward each other. In each of the tab groups, the extension includes a welding portion welded to the conductive member having the same polarity in a state in which all of the tabs configuring the tab group are stacked and a step portion located closer to a distal side of the tab group than the welding portion. In the step portion, the tabs are stacked so that distal ends of the tabs are misaligned in a stepped manner. At each of the positive side and the negative side, the step portion of the first tab group overlaps with the step portion of the second tab group in a stacking direction of the tabs to form an overlap.

With the above configuration, the extension of the first tab group extends from the foil collection toward the second electrode assembly in the first stacking direction. This limits contact of the distal portion of the first tab group with a case accommodating the electrode assemblies. In the same manner, the extension of the second tab group extends from the foil collection toward the first electrode assembly in the second stacking direction. This limits contact of the distal portion of the second tab group with the case. In addition, the first and second tab groups include the overlap in which the step portions overlap with each other. Thus, as compared to when the first and second tab groups are arranged so that the step portions are opposed each other without overlapping each other, the space used for the first and second tab groups is reduced in the first and second stacking directions.

Preferably, in the power storage device described above, in each of the positive-side first tab group and the negative-side first tab group, a portion of the tabs configuring the foil collection is collected at a location corresponding to the second end of the first electrode assembly, and the extension extends from the foil collection in a direction from the second end toward the first end of the first electrode assembly. In each of the positive-side second tab group and the negative-side second tab group, a portion of the tabs configuring the foil collection is collected at a location corresponding to the second end of the second electrode assembly, and the extension extends from the foil collection in a direction from the second end toward the first end of the second electrode assembly.

Preferably, in the power storage device described above, at each of a positive side and a negative side, the overlap is arranged between the welding portion of the first tab group and the welding portion of the second tab group in the first stacking direction and the second stacking direction.

With the above configuration, in a state in which the step portions of the first and second tab groups are not overlapped with the welding portions, the welding portions may be welded to the conductive member. This improves welding work efficiency.

To achieve the object described above, a power storage device includes a first electrode assembly and a second electrode assembly, in which each of the electrode assemblies includes multiple positive electrodes and multiple negative electrodes, which are sheets of electrodes differing in polarity from each other, the positive electrodes and the negative electrodes are alternately stacked in an insulated state, and each of the electrodes includes a tab projecting from a portion of one side of the electrode; a positive-side first tab group configured by the tabs of the positive electrodes in the first electrode assembly; a negative-side first tab group configured by the tabs of the negative electrodes in the first electrode assembly; a positive-side second tab group configured by the tabs of the positive electrodes in the second electrode assembly; a negative-side second tab group configured by the tabs of the negative electrodes in the second electrode assembly; a positive-side conductive member joined to the positive-side first tab group and the positive-side second tab group; and a negative-side conductive member joined to the negative-side first tab group and the negative-side second tab group. A direction in which the electrodes are stacked in the first electrode assembly is a first stacking direction. A direction in which the electrodes are stacked in the second electrode assembly is a second stacking direction. Each of the first electrode assembly and the second electrode assembly includes a first end and a second end, which are opposite ends in a corresponding one of the stacking directions. The first electrode assembly and the second electrode assembly are arranged so that an end surface of the first electrode assembly located at the first end is opposed to an end surface of the second electrode assembly located at the first end. At each of a positive side and a negative side, the first tab group and the second tab group each include a foil collection configured by a portion of the tabs collected in the stacking direction of a corresponding one of the electrode assemblies and an extension extending from the foil collection so that the extensions extend toward each other. In each of the tab groups, the extension includes a welding portion welded to the conductive member having the same polarity in a state in which all of the tabs configuring the tab group are stacked and a step portion located closer to a distal side of the tab group than the welding portion. In the step portion, the tabs are stacked so that distal ends of the tabs are misaligned in a stepped manner. In each of the tab groups, the extension includes a folded portion including the step portion, the folded portion being a portion of the extension folded to extend in a direction from the first end toward the second end of a corresponding one of the electrode assemblies.

With the above configuration, the extension of the first tab group extends from the foil collection toward the second electrode assembly in the first stacking direction. This limits contact of the distal portion of the first tab group with a case accommodating the electrode assemblies. In the same manner, the extension of the second tab group extends from the foil collection toward the first electrode assembly in the first stacking direction. This limits contact of the distal portion of the second tab group with the case. In addition, the first and second negative tab groups each include the folded portion obtained by folding the distal region. Thus, as compared to when the first and second tab groups are arranged so that the step portions are opposed to each other without overlapping each other, the space used for the first and second tab groups is reduced in the first and second stacking directions.

Preferably, in the power storage device described above, the folded portion of each of the tab groups includes a fixed part welded to a corresponding one of the extensions.

With the above configuration, the shape of the folded portion is maintained. In addition, the shape of the folded portion may be fixed by a welding device that welds the welding portions of the first and second tab groups to the conductive member. This eliminates the need for another fixing means such as tape or adhesive.

To achieve the object described above, a power storage device includes a first electrode assembly and a second electrode assembly, in which each of the electrode assemblies includes multiple positive electrodes and multiple negative electrodes, which are sheets of electrodes differing in polarity from each other, the positive electrodes and the negative electrodes are alternately stacked in an insulated state, and each of the electrodes includes a tab projecting from a portion of one side of the electrode; a positive-side first tab group configured by the tabs of the positive electrodes in the first electrode assembly; a negative-side first tab group configured by the tabs of the negative electrodes in the first electrode assembly; a positive-side second tab group configured by the tabs of the positive electrodes in the second electrode assembly; a negative-side second tab group configured by the tabs of the negative electrodes in the second electrode assembly; a positive-side conductive member joined to the positive-side first tab group and the positive-side second tab group; and a negative-side conductive member joined to the negative-side first tab group and the negative-side second tab group. A direction in which the electrodes are stacked in the first electrode assembly is a first stacking direction. A direction in which the electrodes are stacked in the second electrode assembly is a second stacking direction. Each of the first electrode assembly and the second electrode assembly includes a first end and a second end, which are opposite ends in a corresponding one of the stacking directions. The first electrode assembly and the second electrode assembly are arranged so that an end surface of the first electrode assembly located at the first end is opposed to an end surface of the second electrode assembly located at the first end. At each of a positive side and a negative side, the first tab group and the second tab group each include a foil collection configured by a portion of the tabs collected in the stacking direction of a corresponding one of the electrode assemblies and an extension extending from the foil collection so that the extensions extend toward each other. In each of the tab groups, the extension includes a welding portion welded to the conductive member having the same polarity in a state in which all of the tabs configuring the tab group are stacked and a step portion located closer to a distal side of the tab group than the welding portion. In the step portion, the tabs are stacked so that distal ends of the tabs are misaligned in a stepped manner. A direction extending along the one side of the electrode is a width-wise direction. At each of a positive side and a negative side, the extension of the first tab group and the extension of the second tab group are located at different positions in the width-wise direction.

With the above configuration, the extension of the first tab group extends from the foil collection toward the second electrode assembly in the first stacking direction. This limits contact of the distal portion of the first tab group with a case accommodating the electrode assemblies. In the same manner, the extension of the second tab group extends from the foil collection toward the first electrode assembly in the second stacking direction. This limits contact of the distal portion of the second tab group with the case. In addition, the extension of the first tab group and the extension of the second tab group are located at different positions in the width-wise direction. Thus, the extension of the first tab group does not overlap with the extension of the second tab group in the first and second stacking directions. Accordingly, the first and second tab groups may be arranged without interference between the step portions. As a result, as compared to when the step portions are opposed to each other without overlapping each other in the first and second stacking directions, the space used for the first and second tab groups is reduced in the first and second stacking directions. In addition, the step portion of one tab group does not overlap the welding portion of the other tab group. This improves the work efficiency when welding the welding portion to the conductive member.

Preferably, in the power storage device described above, at each of the positive side and the negative side, the welding portion of the first tab group and the welding portion of the second tab group are located on a center of the conductive member in the first stacking direction and the second stacking direction.

With the above configuration, as compared to when the welding portions of the first and second tab groups are located at an end of the conductive member in the first and second stacking directions, the length of a current path from the welding portions to the terminal is reduced, which reduces resistance.

MODES FOR CARRYING OUT THE INVENTION

First Embodiment

A first embodiment of a power storage device embodied in a rechargeable battery will now be described below with reference to FIGS. 1 and 2.

Figure 1:
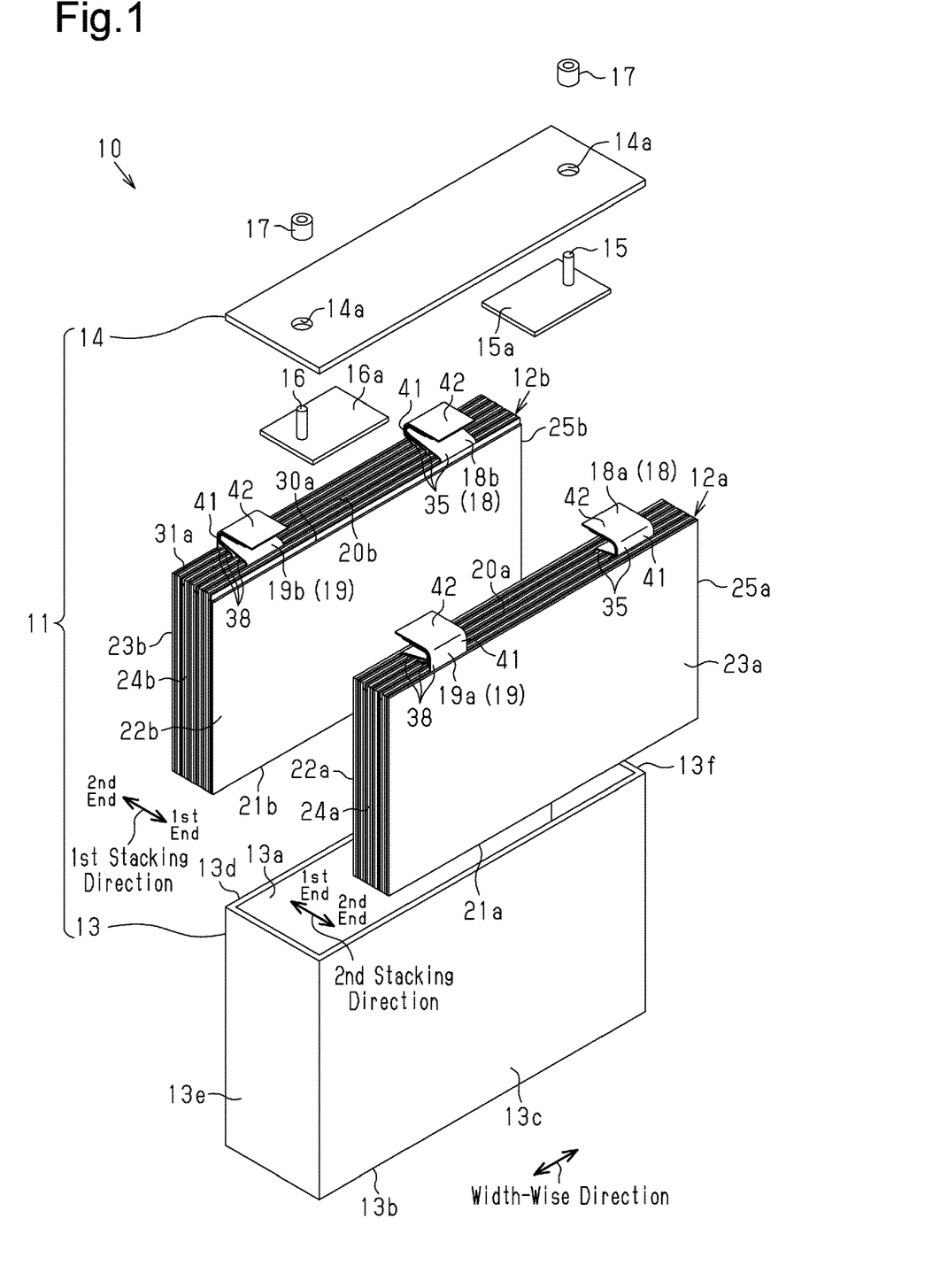
FIG. 1 is an exploded perspective view showing a first embodiment of a rechargeable battery.

As shown in FIG. 1, a rechargeable battery 10 is a power storage device and includes a case 11. The rechargeable battery 10 includes a first electrode assembly 12a, a second electrode assembly 12b, and an electrolytic solution (not shown), which are accommodated in the case 11. The case 11 includes a box-shaped case body 13 and a flat rectangular lid 14 covering an opening 13a of the case body 13. The case body 13 and the lid 14 are both formed of metal (e.g., stainless steel or aluminum). The rechargeable battery 10 of the present embodiment is a prismatic battery having a prismatic outer shape. The rechargeable battery 10 of the present embodiment is a lithium-ion battery.

The case body 13 includes a flat rectangular bottom wall 13b and first to fourth walls 13c to 13f extending upward from the periphery of the bottom wall 13b. The first wall 13c and the second wall 13d are respectively connected to two long peripheral portions of the bottom wall 13b and are faced toward each other. The third wall 13e extends between a first end of the first wall 13c and a first end of the second wall 13d. The fourth wall 13f extends between a second end of the first wall 13c and a second end of the second wall 13d. The third wall 13e and the fourth wall 13f are faced toward each other.

The rechargeable battery 10 includes a positive terminal 15 and a negative terminal 16 so that electricity is drawn out from the first and second electrode assemblies 12a and 12b. The positive terminal 15 and the negative terminal 16 respectively extend through two through holes 14a in the lid 14 and project out of the case 11. Annular insulation rings 17 are coupled to the positive terminal 15 and the negative terminal 16 to insulate the terminals 15 and 16 from the lid 14. The rechargeable battery 10 includes a positive conductive member 15a having the form of a flat rectangle and arranged in the case 11. The rechargeable battery 10 includes a negative conductive member 16a having the form of a flat rectangle and arranged in the case 11. The positive terminal 15 is electrically connected to the positive conductive member 15a. The negative terminal 16 is electrically connected to the negative conductive member 16a.

Figure 2:
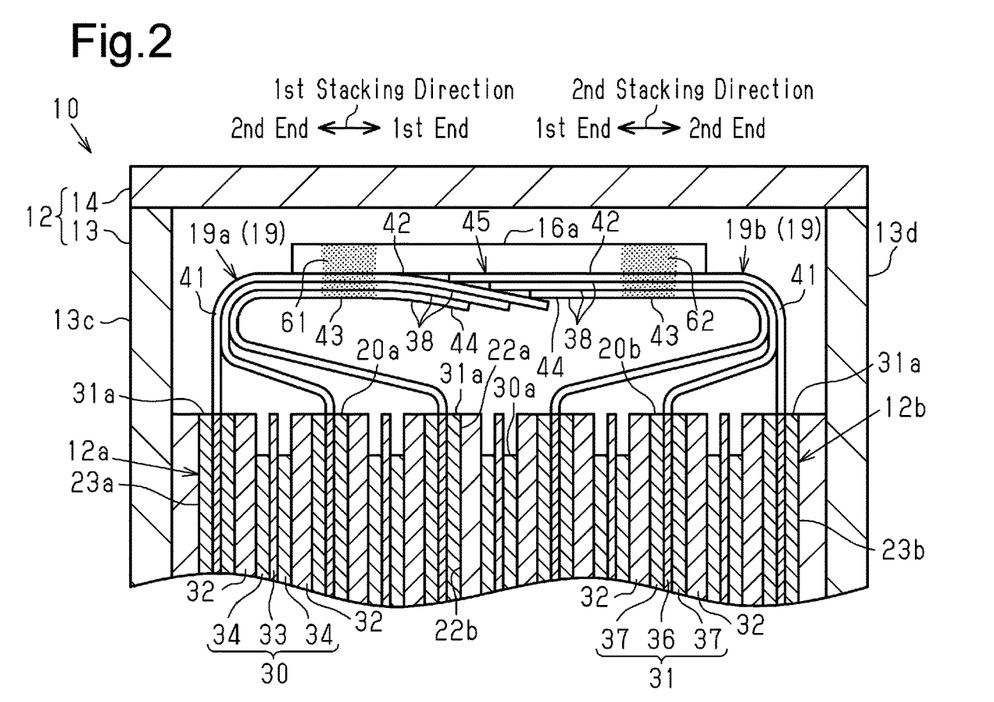
FIG. 2 is a cross-sectional view of the rechargeable battery shown in FIG. 1.

As shown in FIG. 2, the first electrode assembly 12a and the second electrode assembly 12b include multiple sheets of positive electrodes 30, multiple sheets of negative electrodes 31, and multiple sheets of separators 32. The separators 32 are arranged between the positive electrodes 30 and the negative electrodes 31 to insulate the positive electrodes 30 from the negative electrodes 31. The first electrode assembly 12a and the second electrode assembly 12b have a structure in which the positive electrodes 30 and the negative electrodes 31 are alternately stacked with the separators 32 sandwiched in between.

In the first electrode assembly 12a, the direction in which the positive electrodes 30, the negative electrodes 31, and the separators 32 are stacked is referred to as a first stacking direction. In the second electrode assembly 12b, the direction in which the positive electrodes 30, the negative electrodes 31, and the separators 32 are stacked is referred to as a second stacking direction. The first electrode assembly 12a and the second electrode assembly 12b are arranged in the case 11 so that the first stacking direction coincides with the second stacking direction. In the first stacking direction, the first electrode assembly 12a has an end located toward the second electrode assembly 12b defining a first end and another end located toward the first wall 13c of the case body 13 defining a second end. In the same manner, in the second stacking direction, the second electrode assembly 12b has an end located toward the first electrode assembly 12a defining a first end and another end located toward the second wall 13d of the case body 13 defining a second end. More specifically, the first end of the first electrode assembly 12a is located adjacent to the first end of the second electrode assembly 12b.

The positive electrodes 30 each include a rectangular sheet of a positive metal foil 33 (e.g., aluminum foil) and two positive active material layers 34 arranged on opposite surfaces of the positive metal foil 33. The positive electrodes 30 include a first edge 30a, that is, one of two opposite long sides. The positive electrodes 30 include positive tabs 35 projecting from a portion of the first edge 30a (refer to FIG. 1). Opposite surfaces of each positive tab 35 are free of the positive active material layers 34. The positive tab 35 is formed integrally with the positive metal foil 33. More specifically, the positive tab 35 is a portion of the positive metal foil 33 that is free of the positive active material layers 34. The positive tabs 35 project from the first edge 30a of the positive electrodes 30 in a direction orthogonal to the first edge 30a. In the first and second electrode assemblies 12a and 12b, all of the positive tabs 35 have the same projection length.

The negative electrodes 31 each include a rectangular sheet of a negative metal foil 36 (e.g., copper foil) and two negative active material layers 37 arranged on opposite surfaces of the negative metal foil 36. In the present embodiment, the contour of the negative electrodes 31 viewed in the first and second stacking directions is slightly greater than the contour of the positive electrodes 30 viewed in the first and second stacking directions. The negative electrodes 31 include a first edge 31a, that is, one of two opposite long sides. The negative electrodes 31 include negative tabs 38 projecting from a portion of the first edge 31a. Opposite surfaces of each negative tab 38 are free of the negative active material layers 37. The negative tab 38 is formed integrally with the negative metal foil 36. More specifically, the negative tab 38 is a portion of the negative metal foil 36 that is free of the negative active material layers 37. The negative tabs 38 project from the first edge 31a of the negative electrodes 31 in a direction orthogonal to the first edge 31a. The negative tabs 38 project parallel to the positive tabs 35. In the first and second electrode assemblies 12a and 12b, all of the negative tabs 38 have the same projection length. The direction extending along the first edges 30a and 31a of the positive electrodes 30 and the negative electrodes 31 is referred to as a width-wise direction.

The separators 32 are formed from polypropylene (PP). The separators 32 have a fine pore structure so that lithium ions (ions) of the positive active material can pass through in accordance with changing and discharging of the rechargeable battery 10. In the present embodiment, the contour of the separators 32 viewed in the first and second stacking directions is the same size as the contour of the negative electrodes 31 and is slightly greater than the contour of the positive electrodes 30 viewed in the first and second stacking directions.

As shown in FIG. 1, in each of the first and second electrode assemblies 12a and 12b, the positive electrodes 30 are stacked so that the positive tabs 35 are arranged in a line in the stacking direction. The positive tabs 35 are arranged to be aligned with each other in the width-wise direction. In the same manner, in each of the first and second electrode assemblies 12a and 12b, the negative electrodes 31 are stacked so that the negative tabs 38 are arranged in a line in the stacking direction at a position that does not overlap with the positive tabs 35 in the width-wise direction. The negative tabs 38 are arranged to be aligned with each other in the width-wise direction. The negative tabs 38 are located at a position separate from the positive tabs 35 in the width-wise direction.

The rechargeable battery 10 includes positive tab groups 18 configured by the positive tabs 35 and negative tab groups 19 configured by the negative tabs 38. The positive tab group 18 of the first electrode assembly 12a is referred to as a first positive tab group 18a corresponding to a positive-side first tab group. The positive tab group 18 of the second electrode assembly 12b is referred to as a second positive tab group 18b corresponding to a positive-side second tab group. The first positive tab group 18a and the second positive tab group 18b are arranged at the same position in the width-wise direction. The negative tab group 19 of the first electrode assembly 12a is referred to as a first negative tab group 19a corresponding to a negative-side first tab group. The negative tab group 19 of the second electrode assembly 12b is referred to as a second negative tab group 19b corresponding to a negative-side second tab group. In the present embodiment, the first negative tab group 19a and the second negative tab group 19b are arranged at the same position in the width-wise direction.

The first positive tab group 18a and the first negative tab group 19a each include a foil collection 41 configured by a portion of all of the positive tabs 35 or a portion of all of the negative tabs 38 collected at a location corresponding to the second end of the first electrode assembly 12a and an extension 42 extending from the foil collection 41 from the second end toward the first end of the first electrode assembly 12a. The extension 42 of the first positive tab group 18a includes a welding portion that is welded to the positive conductive member 15a with all of the positive tabs 35 stacked and a step portion located closer to the distal side of the first positive tab group 18a than the welding portion. The extension 42 of the first negative tab group 19a includes a welding portion 43 that is welded to the negative conductive member 16*a* with all of the negative tabs 38 stacked and a step portion 44 located closer to the distal side of the first negative tab group 19*a* than the welding portion 43.

As described above, all of the positive tabs 35 have the same projection length, and all of the negative tabs 38 have the same projection length. Thus, in the first positive tab group 18*a*, of two positive tabs 35 having basal portions located adjacent to each other in the first stacking direction, the positive tab 35 located toward the second end of the first electrode assembly 12*a* extends beyond the positive tab 35 located toward the first end of the first electrode assembly 12*a*. More specifically, in the step portion of the first positive tab group 18*a*, the positive tabs 35 are stacked in a state in which the distal ends are misaligned in a stepped manner.

In the same manner, in the first negative tab group 19*a*, of two negative tabs 38 having basal portions located adjacent to each other in the first stacking direction, the negative tab 38 located toward the second end of the first electrode assembly 12*a* extends beyond the negative tab 38 located toward the first end of the first electrode assembly 12*a*. More specifically, in the step portion 44 of the first negative tab group 19*a*, the negative tabs 38 are stacked in a state in which the distal ends are misaligned in a stepped manner.

In the same manner, the second positive tab group 18*b* and the second negative tab group 19*b* each include a foil collection 41 configured by a portion of all of the positive tabs 35 or a portion of all of the negative tabs 38 collected at a location corresponding to the second end of the second electrode assembly 12*b* and an extension 42 extending from the foil collection 41 from the second end toward the first end of the second electrode assembly 12*b*.

The extension 42 of the second positive tab group 18*b* includes a welding portion that is welded to the positive conductive member 15*a* with all of the positive tabs 35 stacked and a step portion located closer to the distal side of the second positive tab group 18*b* than the welding portion. The extension 42 of the second negative tab group 19*b* includes a welding portion 43 that is welded to the negative conductive member 16*a* with all of the negative tabs 38 stacked and a step portion 44 located closer to the distal end of the second negative tab group 19*b* than the welding portion 43.

As described above, all of the positive tabs 35 have the same projection length, and all of the negative tabs 38 have the same projection length. Thus, in the second positive tab group 18*b*, of two positive tabs 35 having basal portions located adjacent to each other in the second stacking direction, the positive tab 35 located toward the second end of the second electrode assembly 12*b* extends beyond the positive tab 35 located toward the first end of the second electrode assembly 12*b*. More specifically, in the step portion of the second positive tab group 18*b*, the positive tabs 35 are stacked in a state in which the distal ends are misaligned in a stepped manner.

In the same manner, in the second negative tab group 19*b*, of two negative tabs 38 having basal portions located adjacent to each other in the second stacking direction, the negative tab 38 located toward the second end of the second electrode assembly 12*b* extends beyond the negative tab 38 located toward the first end of the second electrode assembly 12*b*. More specifically, in the step portion 44 of the second negative tab group 19*b*, the negative tabs 38 are stacked in a state in which the distal ends are misaligned in a stepped manner.

The rechargeable battery 10 of the present embodiment includes an overlap 45 in which the step portion 44 of the first negative tab group 19*a* overlaps with the step portion 44 of the second negative tab group 19*b* in the stacking direction (thickness-wise direction) of the negative tabs 38. In the overlap 45, the step portion 44 of the second negative tab group 19*b* is arranged between the step portion 44 of the first negative tab group 19*a* and the negative conductive member 16*a*. Although not shown in the drawings, in the same manner, the rechargeable battery 10 of the present embodiment includes an overlap in which the step portion of the first positive tab group 18*a* overlaps with the step portion of the second positive tab group 18*b* in the stacking direction (thickness-wise direction) of the positive tabs 35. In this overlap, the step portion of the second positive tab group 18*b* is arranged between the step portion of the first positive tab group 18*a* and the positive conductive member 15*a*.

The first electrode assembly 12*a* includes a tab end surface 20*a*, which is the end surface on which the first positive tab group 18*a* and the first negative tab group 19*a* are arranged, and a bottom end surface 21*a*, which is the end surface opposite to the tab end surface 20*a*. The first electrode assembly 12*a* includes a first end surface 22*a* and a second end surface 23*a* at opposite ends in the first stacking direction. The first end surface 22*a* is located at the first end in the first stacking direction and is opposed to the second electrode assembly 12*b*. The second end surface 23*a* is located at the second end in the first stacking direction and is opposed to the inner surface of the first wall 13*c* of the case body 13. The first electrode assembly 12*a* includes a third end surface 24*a* and a fourth end surface 25*a* at opposite ends in the width-wise direction. The third end surface 24*a* is opposed to the inner surface of the third wall 13*e* of the case body 13. The fourth end surface 25*a* is opposed to the inner surface of the fourth wall 13*f* of the case body 13.

In the same manner, the second electrode assembly 12*b* includes a tab end surface 20*b*, which is the end surface on which the second positive tab group 18*b* and the second negative tab group 19*b* are arranged and a bottom end surface 21*b*, which is the end surface opposite to the tab end surface 20*b*. The second electrode assembly 12*b* includes a first end surface 22*b* and a second end surface 23*b* at opposite ends in the second stacking direction. The first end surface 22*b* is located at the first end in the second stacking direction and is opposed to the first end surface 22*a* of the first electrode assembly 12*a*. The second end surface 23*b* is located at the second end in the second stacking direction and is opposed to the inner surface of the second wall 13*d* of the case body 13. The second electrode assembly 12*b* includes a third end surface 24*b* and a fourth end surface 25*b* at opposite ends in the width-wise direction. The third end surface 24*b* is opposed to the inner surface of the third wall 13*e* of the case body 13. The fourth end surface 25*b* is opposed to the inner surface of the fourth wall 13*f* of the case body 13.

As described above, the first electrode assembly 12*a* and the second electrode assembly 12*b* are arranged beside each other in the first and second stacking directions so that the first end surface 22*a* of the first electrode assembly 12*a* is opposed to the second end surface 23*b* of the second electrode assembly 12*b*. The first and second stacking directions correspond to a direction in which all of the electrodes configuring the first electrode assembly 12*a* and all of the electrodes configuring the second electrode assembly 12*b* are arranged beside one another.

As shown in FIG. 2, the rechargeable battery 10 includes a first negative weld portion 61 that welds the welding portion 43 of the first negative tab group 19*a* to the negative conductive member 16a. The rechargeable battery 10 further includes a second negative weld portion 62 that welds the welding portion 43 of the second negative tab group 19b to the negative conductive member 16a. The overlap 45 of the first and second negative tab groups 19a and 19b is arranged between the first negative weld portion 61 and the second negative weld portion 62 in the first and second stacking directions. Although not shown in the drawings, in the same manner, the rechargeable battery 10 includes a first positive weld portion that welds the welding portion of the first positive tab group 18a to the positive conductive member 15a. The rechargeable battery 10 includes a second positive weld portion that welds the welding portion of the second positive tab group 18b to the positive conductive member 15a. The overlap of the first and second positive tab groups 18a and 18b is arranged between the first positive weld portion and the second positive weld portion in the first and second stacking directions.

The advantages of the first embodiment will now be described with its operation.

(1-1) The extension 42 of the first negative tab group 19a extends from the foil collection 41 toward the second electrode assembly 12b in the first stacking direction. This limits contact of the distal portion of the first negative tab group 19a with the case body 13. In the same manner, the extension 42 of the second negative tab group 19b extends from the foil collection 41 toward the first electrode assembly 12a in the second stacking direction. This limits contact of the distal portion of the second negative tab group 19b with the case body 13. In addition, the rechargeable battery 10 includes the overlap 45, in which the step portions 44 of the first and second negative tab groups 19a and 19b overlap with each other. Thus, as compared to when the first and second negative tab groups 19a and 19b are arranged so that the step portions 44 are opposed each other without overlapping each other, the space used for the first and second negative tab groups 19a and 19b is reduced in the first and second stacking directions. The same applies to the first and second positive tab groups 18a and 18b.

(1-2) The overlap 45, in which the step portions 44 of the first and second negative tab groups 19a and 19b overlap with each other, is arranged between the welding portion 43 of the first negative tab group 19a and the welding portion 43 of the second negative tab group 19b in the first and second stacking directions. Thus, in a state in which the step portions 44 of the first and second negative tab groups 19a and 19b are not overlapped with the welding portions 43, the welding portions 43 may be welded to the negative conductive member 16a. This improves the welding work efficiency. The same applies to the overlap in which the step portions of the first and second positive tab groups 18a and 18b overlap with each other.

Second Embodiment

A second embodiment of a power storage device embodied in a rechargeable battery will now be described below with reference to FIG. 3. The same configurations as the first embodiment will not be described in detail. Only the differences from the first embodiment will be described.

Figure 3:
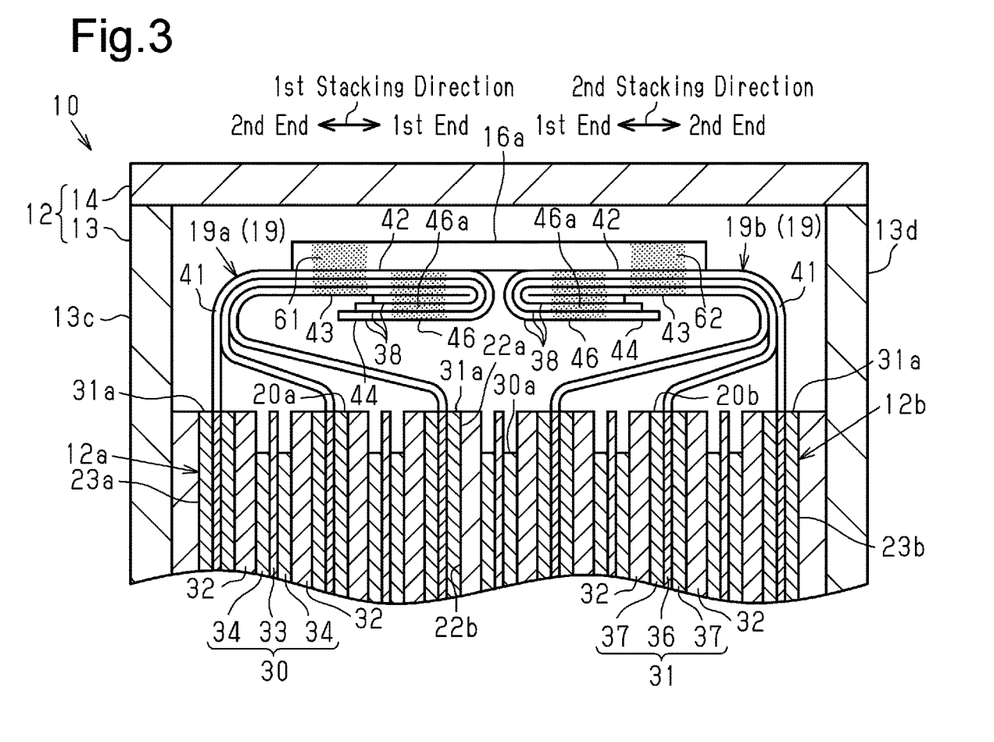
FIG. 3 is a cross-sectional view showing a second embodiment of a rechargeable battery.

As shown in FIG. 3, the first and second negative tab groups 19a and 19b respectively include folded portions 46 in which distal regions of the negative tab groups 19a and 19b are folded to extend in a direction from the first end toward the second end of the electrode assemblies 12a and 12b. More specifically, in each of the negative tab groups 19a and 19b, the folded portion 46 is a portion obtained by folding the distal region of the extension 42 including the step portion at 180 degrees. Each folded portion 46 includes a fixed part 46a welded to the extension 42 on a portion extending from the welding portion 43 toward the first end along the negative conductive member 16a.

In each folded portion 46, the step portion 44 is located in the distal region of the negative tabs 38 extending beyond the fixed part 46a. In the present embodiment, the position of each fixed part 46a differs from the positions of the first and second negative weld portions 61 and 62 in the first and second stacking directions.

Although not shown in the drawings, in the same manner, the first and second positive tab groups 18a and 18b respectively include folded portions in which distal regions of the positive tab groups 18a and 18b are folded to extend in a direction from the first end toward the second end of the electrode assemblies 12a and 12b. More specifically, in each of the positive tab groups 18a and 18b, the folded portion is a portion obtained by folding the distal region of the extension 42 including the step portion at 180 degrees. Each folded portion includes a fixed part welded to the extension 42 on a portion extending from the welding portion 43 toward the first end along the positive conductive member 15a.

In each of the positive tab groups 18a and 18b, the folded portion includes the step portion 44 in the distal region of the positive tabs 35 extending beyond the fixed part. In the present embodiment, the position of each fixed part differs from the positions of the first and second positive weld portions in the first and second stacking directions.

The advantages of the second embodiment will now be described with its operation.

(2-1) The extension 42 of the first negative tab group 19a extends from the foil collection 41 toward the second electrode assembly 12b in the first stacking direction. This limits contact of the distal portion of the first negative tab group 19a with the case body 13. In the same manner, the extension 42 of the second negative tab group 19b extends from the foil collection 41 toward the first electrode assembly 12a in the second stacking direction. This limits contact of the distal portion of the second negative tab group 19b with the case body 13. In addition, the first and second negative tab groups 19a and 19b each include the folded portion 46 obtained by folding the distal region. Thus, as compared to when the first and second negative tab groups 19a and 19b are arranged so that the step portions 44 are opposed each other without overlapping each other, the space used for the first and second negative tab groups 19a and 19b is reduced in the first and second stacking directions. The same applies to the first and second positive tab groups 18a and 18b.

(2-2) The folded portions 46 of the first and second negative tab groups 19a and 19b each include the fixed part 46a. Thus, the shape of the folded portions 46 is maintained. In addition, the shape of the folded portions 46 may be fixed by a welding device that welds the welding portions 43 to the negative conductive member 16a. This eliminates the need for another fixing means such as tape or adhesive. The same applies to the folded portions of the first and second positive tab groups 18a and 18b.

Third Embodiment

A third embodiment of a power storage device embodied in a rechargeable battery will now be described below with reference to FIGS. 4 to 6. The same configurations as the first embodiment will not be described in detail. Only the differences from the first embodiment will be described.

In the first electrode assembly 12a, the positive tabs 35 of the positive electrodes 30 projecting from a portion of the first edge 30a are referred to as first positive tabs 35a, and the negative tabs of the negative electrodes 31 projecting from a portion of the first edge 31a are referred to as first negative tabs 38a. In the same manner, in the second electrode assembly 12b, the positive tabs 35 of the positive electrodes 30 projecting from a portion of the first edge 30a are referred to as second positive tabs 35b, and the negative tabs 38 of the negative electrodes 31 projecting from a portion of the first edge 31a are referred to as second negative tabs 38b.

Figure 4:
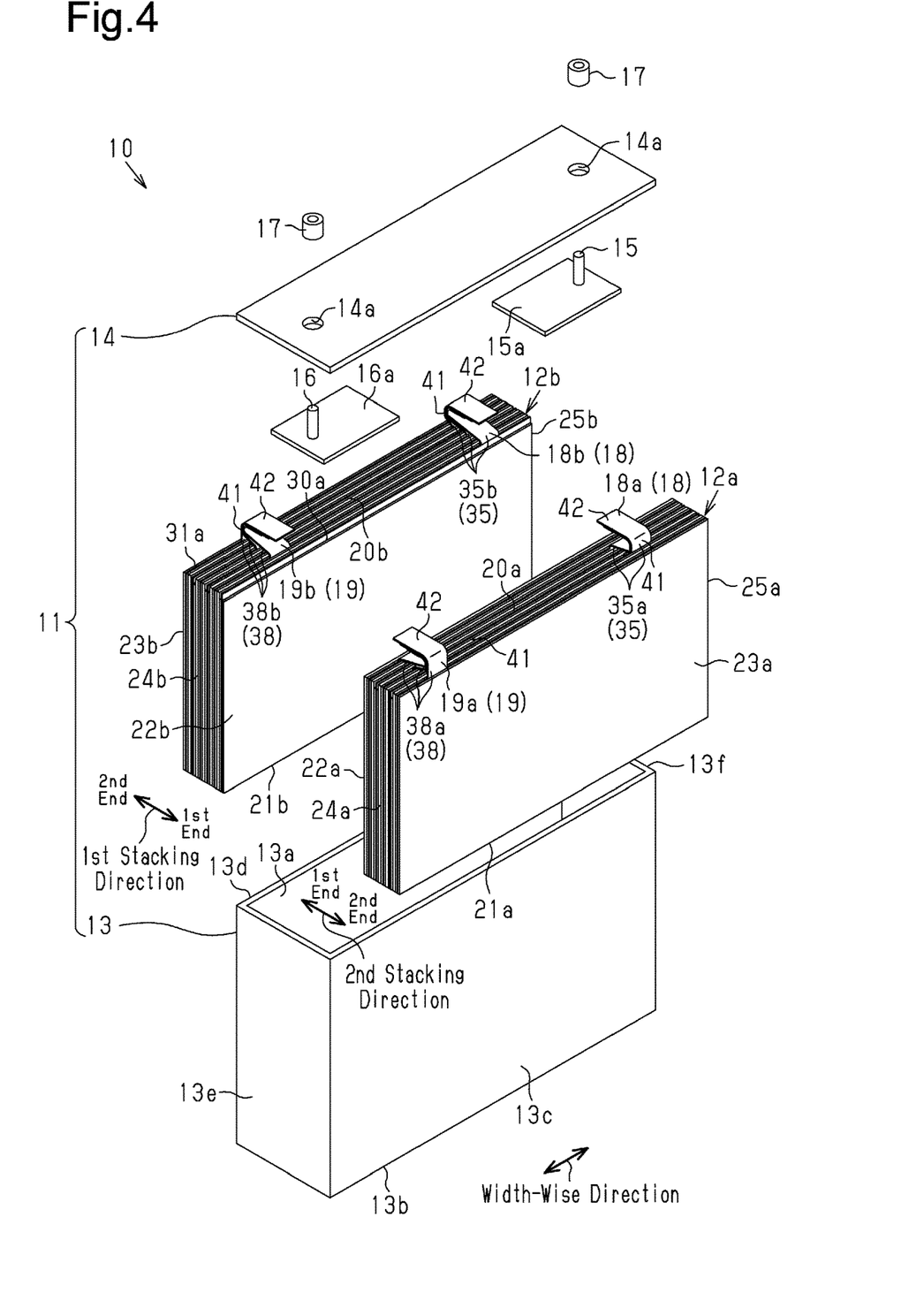
FIG. 4 is an exploded perspective view showing a third embodiment of a rechargeable battery.
Figure 5:
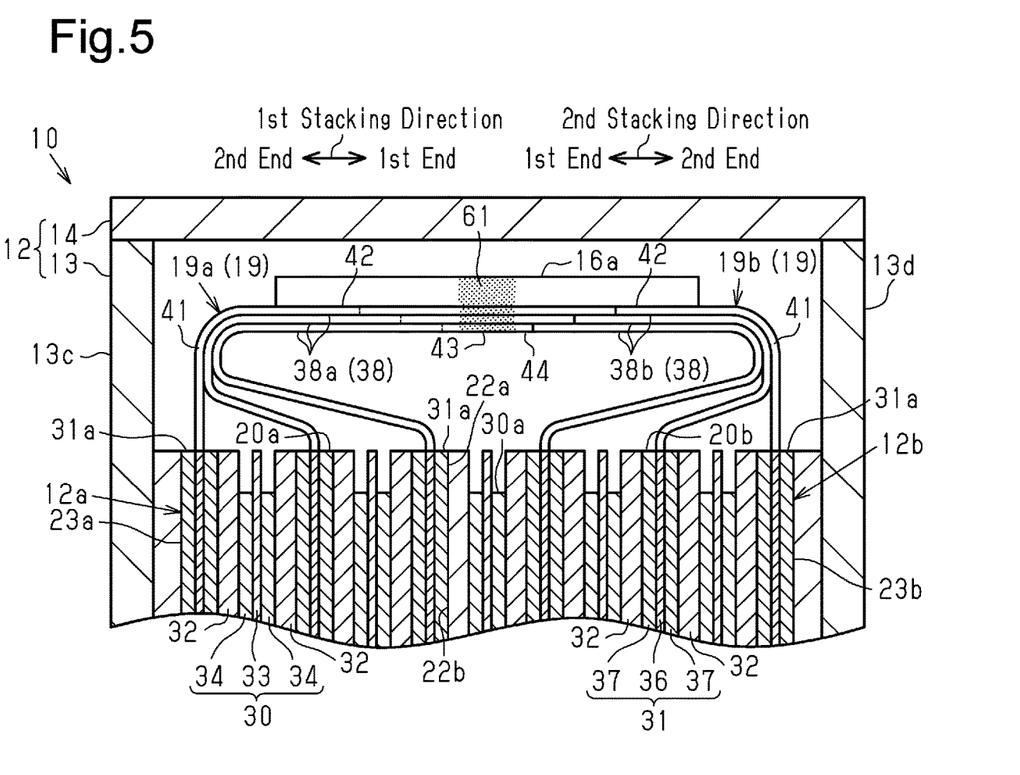
FIG. 5 is a cross-sectional view of the rechargeable battery shown in FIG. 4.
Figure 6:
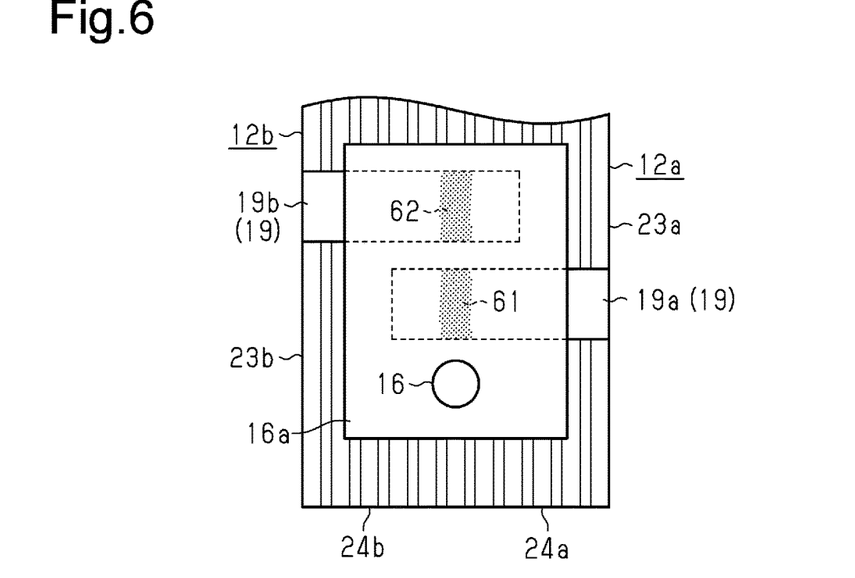
FIG. 6 is a plan view showing the position of weld portions of the rechargeable battery shown in FIG. 4.

As shown in FIGS. 4, 5, and 6, all of the first negative tabs 38a are located at a position different from all of the second negative tabs 38b in the width-wise direction. All of the first negative tabs 38a are located closer to the third end surfaces 24a and 24b than all of the second negative tabs 38b in the width-wise direction. Accordingly, the first negative tab group 19a configured by the first negative tabs 38a is also located closer to the third end surfaces 24a and 24b than the second negative tab group 19b configured by the second negative tabs 38b in the width-wise direction. In addition, the first negative weld portion 61, which welds the first negative tab group 19a to the negative conductive member 16a, is located closer to the third end surfaces 24a and 24b than the second negative weld portion 62, which welds the second negative tab group 19b to the negative conductive member 16a, in the width-wise direction.

As shown in FIG. 6, the welding portion 43 (first negative weld portion 61) of the first negative tab group 19a and the welding portion 43 (second negative weld portion 62) of the second negative tab group 19b are located on the center of the negative conductive member 16a in the first and second stacking directions. The negative terminal 16 is located on the center of the negative conductive member 16a in the first and second stacking directions.

In the same manner, all of the first positive tabs 35a are located at a position different from all of the second positive tabs 35b in the width-wise direction. All of the second positive tabs 35b are located closer to the fourth end surfaces 25a and 25b than all of the first positive tabs 35a in the width-wise direction. Accordingly, the second positive tab group 18b configured by the positive tabs 35b is located closer to the fourth end surfaces 25a and 25b than the first positive tab group 18a configured by the first positive tabs 35a in the width-wise direction. In addition, the second positive weld portion, which welds the second positive tab group 18b to the positive conductive member 15a, is located closer to the fourth end surfaces 25a and 25b than the first positive weld portion, which welds the first positive tab group 18a to the positive conductive member 15a, in the width-wise direction.

The welding portion (first positive weld portion) of the first positive tab group 18a and the welding portion (second positive weld portion) of the second positive tab group 18b are located on the center of the positive conductive member 15a in the first and second stacking directions. The positive terminal 15 is located on the center of the positive conductive member 15a in the first and second stacking directions.

The advantages of the third embodiment will now be described with its operation.

(3-1) The extension 42 of the first negative tab group 19a extends from the foil collection 41 toward the second electrode assembly 12b in the first stacking direction. This limits contact of the distal portion of the first negative tab group 19a with the case body 13. In the same manner, the extension 42 of the second negative tab group 19b extends from the foil collection 41 toward the first electrode assembly 12a in the second stacking direction. This limits contact of the distal portion of the second negative tab group 19b with the case body 13. In addition, the extension 42 of the first negative tab group 19a and the extension 42 of the second negative tab group 19b are located at different positions in the width-wise direction. Thus, the extensions 42 do not overlap with each other in the first and second stacking directions. Thus, the first and second negative tab groups 19a and 19b may be arranged without interference between the step portions 44. As a result, as compared to when the step portions 44 are opposed to each other without overlapping each other in the first and second stacking directions, the space used for the first and second negative tab groups 19a and 19b is reduced in the first and second stacking directions. In addition, the step portion 44 of the first negative tab group 19a does not overlap with the welding portion 43 of the second negative tab group 19b, and the step portion 44 of the second negative tab group 19b does not overlap with the welding portion 43 of the first negative tab group 19a. This improves the work efficiency when welding the welding portions 43 to the negative conductive member 16a. The same applies to the first and second positive tab groups 18a and 18b.

(3-2) The welding portions 43 of the first and second negative tab groups 19a and 19b are located on the center of the negative conductive member 16a in the first and second stacking directions. Thus, as compared to when the welding portions 43 of the first and second negative tab groups 19a and 19b are located at an end of the negative conductive member 16a in the first and second stacking directions, the length of a current path from the welding portions 43 to the negative terminal 16 is reduced, which reduces resistance. The same applies to the welding portions of the first and second positive tab groups 18a and 18b.

The first to third embodiments may be modified as follows.

The electrode assembly 12 includes multiple positive electrodes 30 and multiple negative electrodes 31 and has a structure in which the positive electrodes 30 and the negative electrodes 31 are alternately stacked with the separators 32 sandwiched in between. However, the structure of the electrode assembly 12 is not limited to this. For example, the electrode assembly 12 may have a structure such that electrode accommodation separators accommodate positive electrodes, and the electrode accommodation separators and negative electrodes are alternately stacked. The positive tab of each positive electrode is not accommodated in the electrode accommodation separator and projects from the electrode accommodation separator.

The positive electrodes 30 may have a structure in which the positive active material layer 34 is arranged on one surface of the positive metal foil 33. In the same manner, the negative electrodes 31 may have a structure in which the negative active material layer 37 is arranged on one surface of the negative metal foil 36.

In each of the positive and negative first tab groups 18a and 19a, portions of the tabs 35 and 38 configuring the foil collections 41 do not necessarily have to be collected at a location corresponding to the second end of the first electrode assembly 12a and may be collected at any position in the first stacking direction. For example, the portions of the tabs 35 and 38 configuring the foil collections 41 may be collected on the center of the first electrode assembly 12a or at a position between the center of the first electrode assembly 12a and the second end in the first stacking direction. The same applies to the positive and negative second tab groups 18b and 19b.

In the overlap 45 of the first embodiment, the step portion 44 of the first negative tab group 19a may be arranged between the step portion 44 of the second negative tab group 19b and the negative conductive member 16a. In the same manner, the step portion of the first positive tab group 18a may be arranged between the step portion of the second positive tab group 18b and the positive conductive member 15a.

In the second embodiment, the fixed parts 46a of the folded portions 46 may be welded to the welding portions 43. In this case, in the first electrode assembly 12a, the positive and negative fixed parts 46a are located at the same position as the corresponding one of the first negative weld portion 61 and the first positive weld portion in the first stacking direction. In the same manner, in the second electrode assembly 12b, the negative and positive fixed parts 46a are located at the same position as the corresponding one of the second negative weld portion 62 and the second positive weld portion in the second stacking direction.

In the second embodiment, the fixed parts 46a may be omitted from the folded portions 46.

In the second embodiment, the process of fixing the fixed parts 46a of the folded portions 46 is not limited to welding. The fixed parts 46a of the folded portions 46 may be fixed, for example, with tape or adhesive.

In the third embodiment, the first positive tab group 18a may be located closer to the fourth end surfaces 25a and 25b than the second positive tab group 18b in the width-wise direction. In the same manner, the second negative tab group 19b may be located closer to the third end surfaces 24a and 24b than the first negative tab group 19a in the width-wise direction. That is, any configuration may be employed as long as the first positive tab group 18a and the second positive tab group 18b are located at different positions in the width-wise direction. Also, any configuration may be employed as long as the first negative tab group 19a and the second negative tab group 19b are located at different positions in the width-wise direction.

In the third embodiment, each of the first negative weld portion 61 and the second negative weld portion 62 may be arranged at a position separated from the center of the negative conductive member 16a in the first and second stacking directions. In the same manner, each of the first positive weld portion and the second positive weld portion may be arranged at a position separated from the center of the positive conductive member 15a in the first and second stacking directions.

The structure of the positive conductive member 15a and the negative conductive member 16a may be modified as follows. While the negative conductive member 16a will be described in detail, the same applies to the positive conductive member 15a.

Figure 7:
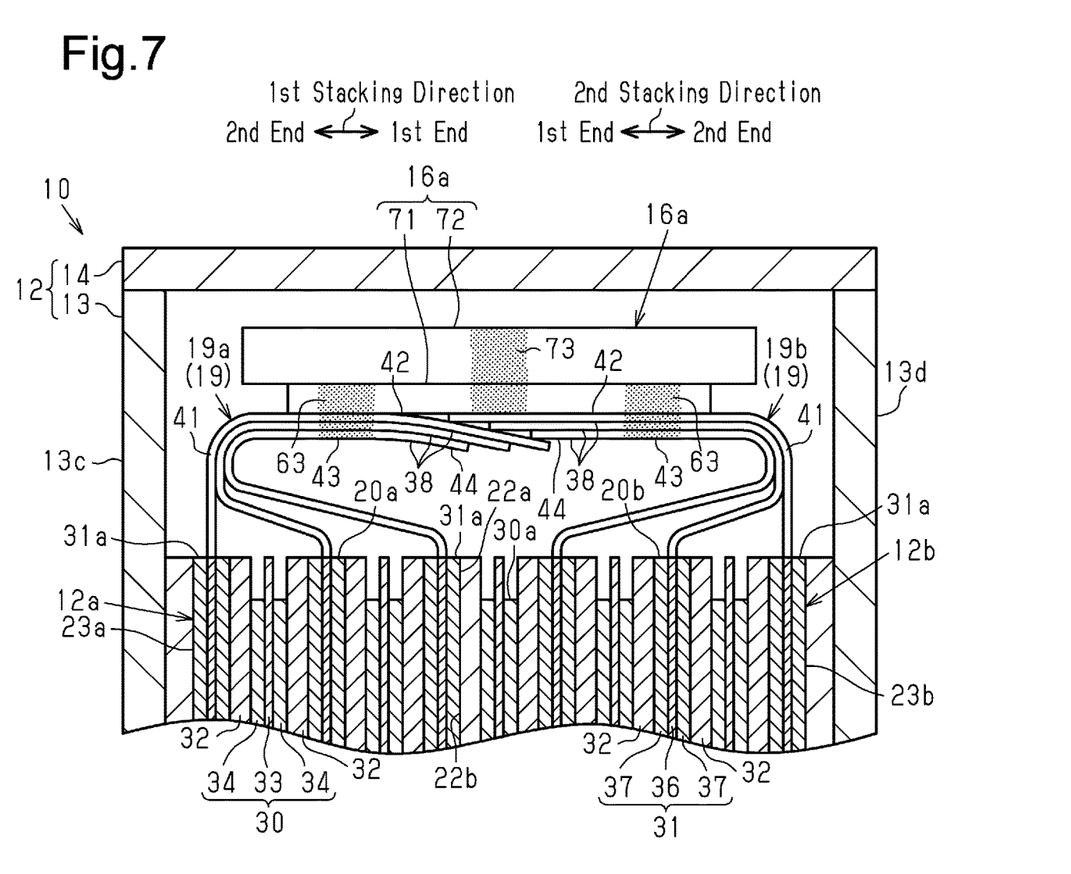
FIG. 7 is a cross-sectional view showing a further example of a rechargeable battery.

As shown in FIG. 7, the negative conductive member 16a includes flat rectangular first portion 71 and second portion 72. The rechargeable battery 10 includes a weld portion 63 that welds the welding portions 43 of the first and second negative tab groups 19a and 19b to the first portion 71. The first portion 71 is located between the first and second negative tab groups 19a and 19b and the second portion 72. The second portion 72 is arranged between the first portion 71 and the lid 14. The negative conductive member 16a includes a joint 73 that welds the first portion 71 to the second portion 72. The negative terminal 16 (not shown in FIG. 7) is electrically connected to the first and second negative tab groups 19a and 19b via the first portion 71 and the second portion 72. The position of the joint 73 in the first and second stacking directions may be the same as the position of the weld portion 63 or may differ from the position of the weld portion 63 as shown in FIG. 7.

The rechargeable battery 10 may be a lithium-ion rechargeable battery or another rechargeable battery. That is, any configuration may be employed as long as ions move between the positive active material and the negative active material and supply and receive electric charge.

The power storage device is applicable to a power storage device other than a rechargeable battery such as a capacitor.

The invention claimed is:

1. A power storage device comprising:
a first electrode assembly and a second electrode assembly, wherein each of the electrode assemblies includes multiple positive electrodes and multiple negative electrodes, which are sheets of electrodes differing in polarity from each other, the positive electrodes and the negative electrodes are alternately stacked in an insulated state, and each of the electrodes includes a tab projecting from a portion of one side of the electrode;
a positive-side first tab group configured by the tabs of the positive electrodes in the first electrode assembly;
a negative-side first tab group configured by the tabs of the negative electrodes in the first electrode assembly;
a positive-side second tab group configured by the tabs of the positive electrodes in the second electrode assembly;
a negative-side second tab group configured by the tabs of the negative electrodes in the second electrode assembly;
a positive-side conductive member joined to the positive-side first tab group and the positive-side second tab group; and
a negative-side conductive member joined to the negative-side first tab group and the negative-side second tab group, wherein
a direction in which the electrodes are stacked in the first electrode assembly is a first stacking direction, a direction in which the electrodes are stacked in the second electrode assembly is a second stacking direction, and each of the first electrode assembly and the second electrode assembly includes a first end and a second end, which are opposite ends in a corresponding one of the stacking directions,
the first electrode assembly and the second electrode assembly are arranged so that an end surface of the first electrode assembly located at the first end of the first electrode assembly is adjacent to an end surface of the second electrode assembly located at the first end of the second electrode assembly,
at each of a positive side and a negative side, the first tab group and the second tab group each include a foil collection configured by a portion of the tabs collected in the stacking direction of a corresponding one of the electrode assemblies and an extension extending from the foil collection so that the extensions extend toward each other,
in each of the tab groups, the extension includes a welding portion welded to the conductive member having the same polarity in a state in which all of the tabs configuring the tab group are stacked and a step portion located closer to a distal side of the tab group than the welding portion, wherein in the step portion, the tabs are stacked so that distal ends of the tabs are misaligned in a stepped manner, and at each of the positive side and the negative side, the step portion of the first tab group overlaps with the step portion of the second tab group in a stacking direction of the tabs to form an overlap.

2. The power storage device according to claim 1, wherein
in each of the positive-side first tab group and the negative-side first tab group, a portion of the tabs configuring the foil collection is collected at a location corresponding to the second end of the first electrode assembly, and the extension extends from the foil collection in a direction from the second end toward the first end of the first electrode assembly, and
in each of the positive-side second tab group and the negative-side second tab group, a portion of the tabs configuring the foil collection is collected at a location corresponding to the second end of the second electrode assembly, and the extension extends from the foil collection in a direction from the second end toward the first end of the second electrode assembly.

3. The power storage device according to claim 1, wherein at each of a positive side and a negative side, the overlap is arranged between the welding portion of the first tab group and the welding portion of the second tab group in the first stacking direction and the second stacking direction.

4. A power storage device comprising:
a first electrode assembly and a second electrode assembly, wherein each of the electrode assemblies includes multiple positive electrodes and multiple negative electrodes, which are sheets of electrodes differing in polarity from each other, the positive electrodes and the negative electrodes are alternately stacked in an insulated state, and each of the electrodes includes a tab projecting from a portion of one side of the electrode;
a positive-side first tab group configured by the tabs of the positive electrodes in the first electrode assembly;
a negative-side first tab group configured by the tabs of the negative electrodes in the first electrode assembly;
a positive-side second tab group configured by the tabs of the positive electrodes in the second electrode assembly;
a negative-side second tab group configured by the tabs of the negative electrodes in the second electrode assembly;
a positive-side conductive member joined to the positive-side first tab group and the positive-side second tab group; and
a negative-side conductive member joined to the negative-side first tab group and the negative-side second tab group, wherein
a direction in which the electrodes are stacked in the first electrode assembly is a first stacking direction, a direction in which the electrodes are stacked in the second electrode assembly is a second stacking direction, and each of the first electrode assembly and the second electrode assembly includes a first end and a second end, which are opposite ends in a corresponding one of the stacking directions,
the first electrode assembly and the second electrode assembly are arranged so that an end surface of the first electrode assembly located at the first end of the first electrode assembly is adjacent to an end surface of the second electrode assembly located at the first end of the second electrode assembly,
at each of a positive side and a negative side, the first tab group and the second tab group each include a foil collection configured by a portion of the tabs collected in the stacking direction of a corresponding one of the electrode assemblies and an extension extending from the foil collection so that the extensions extend toward each other, in each of the tab groups, the extension includes a welding portion welded to the conductive member having the same polarity in a state in which all of the tabs configuring the tab group are stacked and a step portion located closer to a distal side of the tab group than the welding portion, wherein in the step portion, the tabs are stacked so that distal ends of the tabs are misaligned in a stepped manner, in each of the tab groups, the extension includes a folded portion including the step portion, the folded portion being a portion of the extension folded to extend in a direction from the first end toward the second end of a corresponding one of the electrode assemblies, in each of the tab groups, the folded portion is a portion obtained by folding a distal region of the extension including the step portion at 180 degrees, the folded portion of each of the tab groups includes a fixed part welded to a corresponding one of the extensions, and the fixed part is positioned between a tip of the tab groups and the welding portion.

5. A power storage device comprising:
a first electrode assembly and a second electrode assembly, wherein each of the electrode assemblies includes multiple positive electrodes and multiple negative electrodes, which are sheets of electrodes differing in polarity from each other, the positive electrodes and the negative electrodes are alternately stacked in an insulated state, and each of the electrodes includes a tab projecting from a portion of one side of the electrode;
a positive-side first tab group configured by the tabs of the positive electrodes in the first electrode assembly;
a negative-side first tab group configured by the tabs of the negative electrodes in the first electrode assembly;
a positive-side second tab group configured by the tabs of the positive electrodes in the second electrode assembly;
a negative-side second tab group configured by the tabs of the negative electrodes in the second electrode assembly;
a positive-side conductive member joined to the positive-side first tab group and the positive-side second tab group; and
a negative-side conductive member joined to the negative-side first tab group and the negative-side second tab group, wherein
a direction in which the electrodes are stacked in the first electrode assembly is a first stacking direction, a direction in which the electrodes are stacked in the second electrode assembly is a second stacking direction, and each of the first electrode assembly and the second electrode assembly includes a first end and a second end, which are opposite ends in a corresponding one of the stacking directions,
the first electrode assembly and the second electrode assembly are arranged so that an end surface of the first electrode assembly located at the first end of the first electrode assembly is adjacent to an end surface of the second electrode assembly located at the first end of the second electrode assembly,
at each of a positive side and a negative side, the first tab group and the second tab group each include a foil collection configured by a portion of the tabs collected in the stacking direction of a corresponding one of the electrode assemblies and an extension extending from the foil collection so that the extensions extend toward each other, in each of the tab groups, the extension includes a welding portion welded to the conductive member having the same polarity in a state in which all of the tabs configuring the tab group are stacked and a step portion located closer to a distal side of the tab group than the welding portion, wherein in the step portion, the tabs are stacked so that distal ends of the tabs are misaligned in a stepped manner, a direction extending along the one side of the electrode is a width-wise direction, at each of a positive side and a negative side, the extension of the first tab group and the extension of the second tab group are located at different positions in the width-wise direction, and wherein:

the step portion of the first tab group of the positive side of the first electrode assembly overlaps with the second tab group of the positive side of the second electrode assembly when viewed from a direction orthogonal to the first stacking direction, and the step portion of the first tab group of the negative side of the first electrode assembly overlaps with the second tab group of the negative side of the second electrode assembly when viewed from the direction orthogonal to the first stacking direction.

6. The power storage device according to claim 5, wherein at each of the positive side and the negative side, the welding portion of the first tab group and the welding portion of the second tab group are located on a center of the conductive member in the first stacking direction and the second stacking direction.

7. The power storage device according to claim 1, wherein the step portion of the first tab group of the positive side of the first electrode assembly overlaps with the second tab group of the positive side of the second electrode assembly when viewed from a direction orthogonal to the first stacking direction.

* * * * *